(No Model.) 2 Sheets—Sheet 1.

J. N. LEITCH.
CARRIAGE.

No. 556,853. Patented Mar. 24, 1896.

WITNESSES
A. N. Pourry
C. G. Grayson

INVENTOR
James N. Leitch,
By his Att'y
Henry W. Williams (No Model.)  J. N. LEITCH.  2 Sheets—Sheet 2.
CARRIAGE.

No. 556,853.  Patented Mar. 24, 1896.

WITNESSES
A. N. Pouncy
C. H. Graydon

INVENTOR
James N. Leitch,
By his Att'y
Henry Williams

UNITED STATES PATENT OFFICE.

JAMES N. LEITCH, OF AMESBURY, MASSACHUSETTS.

CARRIAGE.

SPECIFICATION forming part of Letters Patent No. 556,853, dated March 24, 1896.

Application filed December 28, 1895. Serial No. 573,577. (No model.)

*To all whom it may concern:*

Be it known that I, JAMES N. LEITCH, a subject of the Queen of Great Britain, residing in Amesbury, in the county of Essex and State of Massachusetts, have invented a new and useful Improvement in Carriages, of which the following is a specification.

This invention relates to a two-seated carriage of the class in which when the rear seat is to be used the lazy-back thereof is swung up into a substantially vertical position; but when the rear seat is not to be used the lazy-back is swung down into a horizontal position and serves as a deck. Moreover, it relates to that class of carriages in which the lazy-back of the rear seat extends beyond—i. e., to the rear of—the back of the body, whereby additional space is provided for the occupants of the rear seat without elongating the body.

The nature of the invention is fully described below and illustrated in the accompanying drawings, in which—

Figure 1:
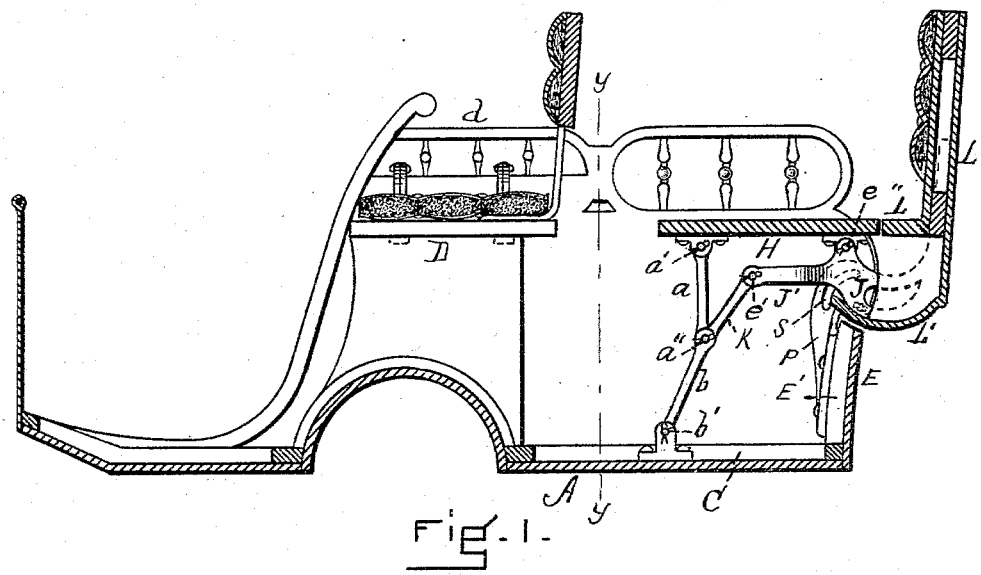
Figure 2:
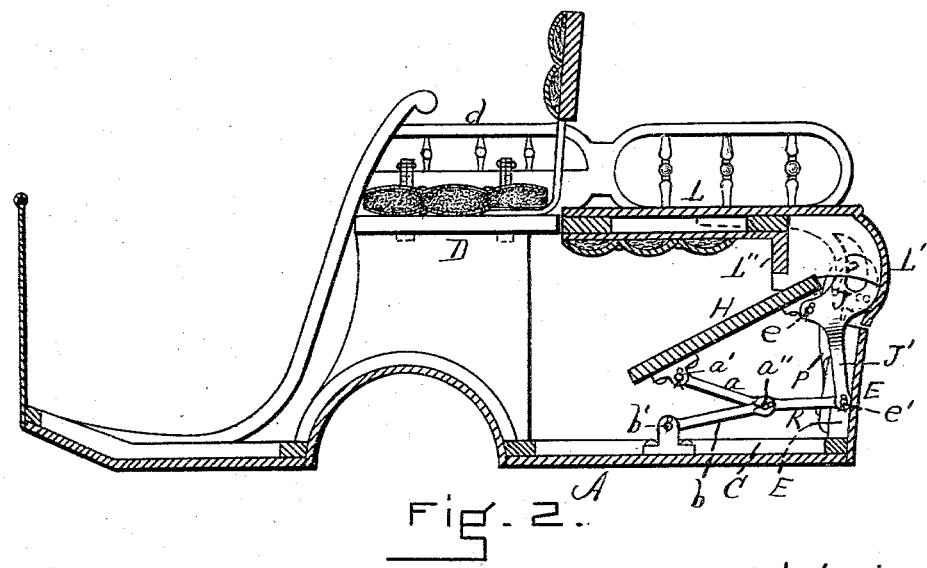
Figure 3:
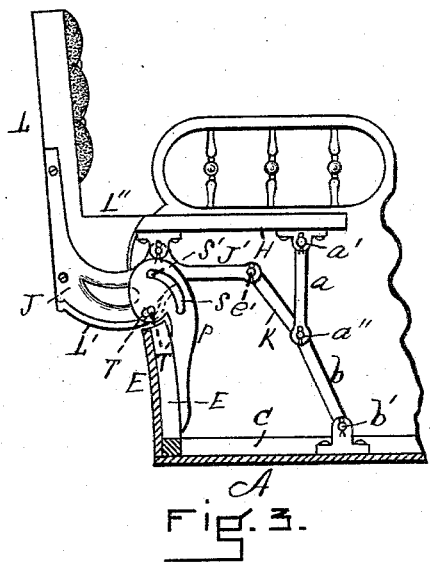
Figure 4:
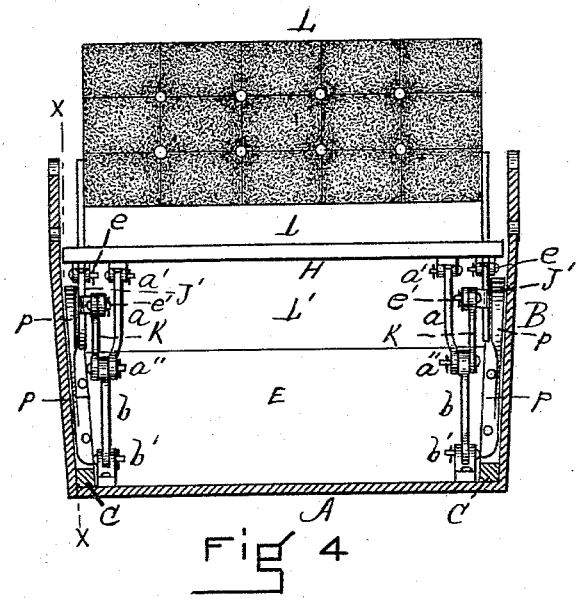

Figure 1 is a longitudinal vertical section of a carriage-body embodying my invention with the rear seat arranged in position for use. Fig. 2 is a similar section with the lazy-back of the rear seat lowered into position for use as a deck-panel. Fig. 3 is a section taken on line $x$, Fig. 4, looking inward. Fig. 4 is a cross vertical section taken on line $y$, Fig. 1, looking rearward.

Similar letters of reference indicate corresponding parts.

A represents the floor; B, the sides; C, the sills, and D is a divided front seat, each half of which is adapted to swing over the side rail $d$ in the ordinary manner for the purpose of allowing access to the rear seat, none of said parts being new in this invention.

E is the immovable back, made sufficiently low to provide space for the operation of the lazy-back in the manner described below.

H is the rear seat or the main portion thereof. At each end of the rear seat a lever $a$ is pivoted at $a'$ to the under side of said rear seat near its forward end, and the lower end of said lever is pivoted at $a''$ to the upper end of the lever $b$, which is pivoted at $b'$ to the floor A or to the sill C, the two levers $a$ and $b$ constituting practically a toggle and supporting the front portion of said rear seat when it is in its raised position, but not being new in this invention.

At each end of the rear seat near its rear edge there is pivoted at $e$ a lever or lazy-back iron J of the peculiar shape shown. The front portion J' of this lever is pivotally connected at $e'$ with a link or lever K, whose forward end is pivotally connected at $a''$ to the toggle $a\,b$, and, in fact, the portion J' and lever K themselves constitute a toggle. The main portions of the lazy-back irons or levers J are secured to the opposite ends of the rear-seat lazy-back L and of the lower portion or extension L' thereof, said lower portion or extension being curved, as shown, in order that it may swing or roll over the back E into and out of the carriage-body as the lazy-back is swung down into position as a deck-panel, and vice versa.

Rigidly secured to the back E of the carriage-body or to posts E' connected therewith, next the opposite sides of the body, are substantially upright irons or brackets P. These irons are set outside of the lazy-back irons J and are each provided with two slots S and T, the former being a long curved slot and the latter a short slot non-concentric with the long slot S. Into these slots S and T extend respectively the pins S' and T', which project horizontally from the lazy-back irons J.

In operation when the lazy-back is swung down from the position indicated in Figs. 1, 3, and 4 into that indicated in Fig. 2 the pins S' T' move from one end of the slots S T to the other end, and the toggles or levers $a\,b$ K J' swing into the position indicated in Fig. 2, thus dropping the rear seat H out of the way of the lazy-back, which is converted into a deck-panel, and of the portion L'', which, when the lazy-back is raised, constitutes the rear part of the seat.

It will be noticed that the lazy-back L does not revolve around a fixed center or axis, as it is not hinged to the back of the body, but has a somewhat irregular and sliding or compound movement by reason of the simultaneous action of the non-concentric cam-grooves S T on the pins S' T', which are rigid with said lazy-back. The effect is to produce a curved and essentially continuous finish at the rear and a substantially tight joint between the lazy-back and the body-back, whether the former is raised or lowered.

Having thus fully described my invention, what I claim, and desire to secure by Letters Patent, is—

1. In a carriage, the body provided with the back E, the substantially vertical irons or brackets P rigidly secured to the body and provided with the long, curved cam-groove S and the cam-groove T, said cam-grooves being non-concentric, the lazy-back L L', and the lazy-back irons J pivotally connected with the under side of the rear seat and provided with the horizontal pins S' T' extending respectively into said grooves S T, substantially as set forth.

2. In a carriage, the body provided with the back E, the substantially vertical irons or brackets P rigidly secured to the body and provided with the long, curved cam-groove S and the cam-groove T, said cam-grooves being non-concentric, the lazy-back L L', the lazy-back irons J pivotally hung from the under side of the rear seat, provided with the pins S' T' engaging said grooves S T respectively and formed with the integral extensions or levers J', the jointed levers or toggles $a\ b$ connecting the under side of the seat with the carriage-body, and the levers or links K pivotally connecting the said toggles at their joints with the free ends of the extensions J', substantially as described.

JAMES N. LEITCH.

Witnesses:
GEO. W. CATE,
ENOCH N. HOYT.